Jan. 14, 1930. J. LEDWINKA 1,743,555
MEANS FOR SECURING UPHOLSTERY AND THE LIKE
Filed Nov. 24, 1925
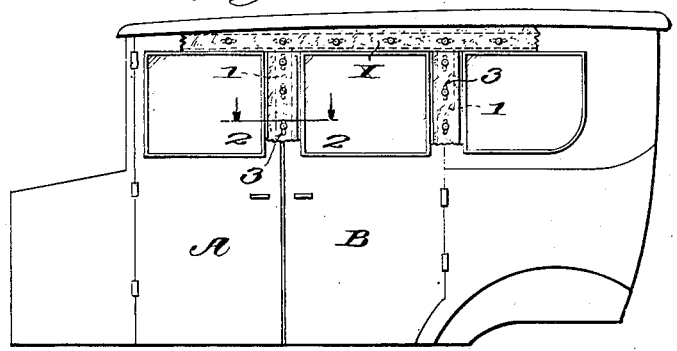
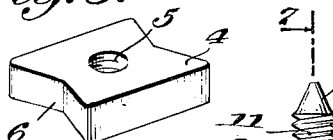
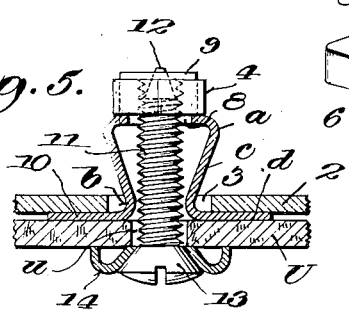
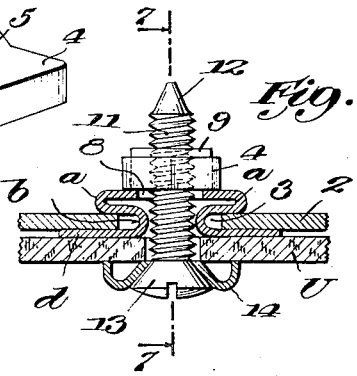
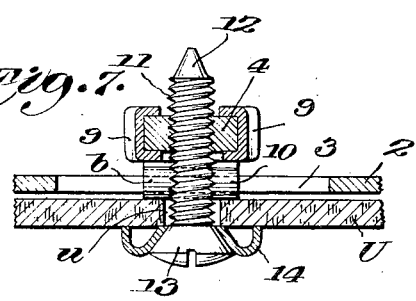
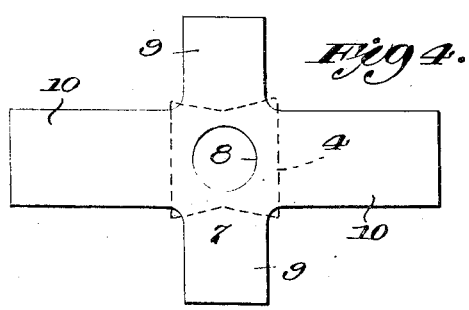
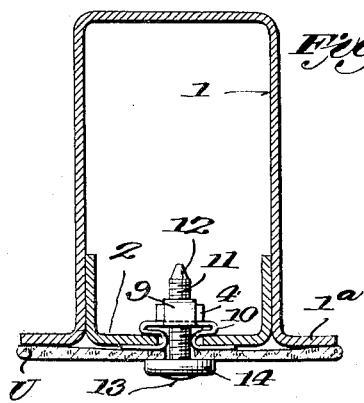
INVENTOR
JOSEPH LEDWINKA
ATTORNEY Patented Jan. 14, 1930

1,743,555

UNITED STATES PATENT OFFICE

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

MEANS FOR SECURING UPHOLSTERY AND THE LIKE

Application filed November 24, 1925. Serial No. 71,036.

This invention relates to a means for and method of fastening upholstery or the like, and more particularly the upholstery or lining of automobiles having all-metal frames.

The object of the invention is to devise a simple and efficient fastening device which can be easily assembled and placed in position to firmly hold the material in place on the frame, and which will also permit of the ready removal and replacement of the upholstery material, when desired.

In order that the invention may be readily understood, reference is had to the accompanying drawing forming part of this specification, and in which:

Fig. 1 is a side elevation of an automobile body of closed type illustrating how my invention is used in connection therewith, parts being broken away for the sake of clearness;

Fig. 2 is an enlarged transverse section through one of the door posts substantially on the line 2—2 of Fig. 1, showing my improved fastening means as it appears when in position;

Fig. 3 is a perspective view of the nut which I employ;

Fig. 4 is a view of the blank from which my improved nut holding clip is formed;

Fig. 5 is a transverse section on an enlarged scale through one of my improved fastening devices showing the initial position of the parts in securing the upholstery or the like in position;

Fig. 6 is a similar view showing the final position of the parts; and

Fig. 7 is a section at right angles to that of Fig. 6, substantially on the line 7—7 of Fig. 6.

Referring to the drawings in detail, 1 designates the usual hollow post or frame member such as is commonly employed in the construction of automobile bodies, such post comprising a sheet metal channel having outturned flanges 1ª, the open side of which is closed by a smaller channel member 2 fitted within the same, as clearly shown in Fig. 2. The post illustrated is the one located at the meeting edges of the two doors A and B.

While in the following detailed description the part of the frame referred to is identified by the numeral 2, it will be understood that this part of the frame is merely typical, since the same description would apply to any other hollow member, in the body construction, such for example, as the longitudinal members indicated at X in Fig. 1.

The member 2 is provided with a series of openings 3 extending therethrough, such openings preferably being in the form of elongated slots.

One part of my improved securing means comprises a nut 4 having a central threaded opening 5 and provided with ends 6 which are recessed or concave, as shown in Fig. 3, for a purpose which will hereinafter appear.

In connection with the nut 4 I employ a nut holding or supporting clip which is formed from a sheet metal blank of the shape shown in Fig. 4. This blank 7 is, generally speaking, in the shape of a cross, and comprises two short arms 9 and two longer arms 10. The blank is provided with a central opening 8 somewhat larger than the opening 5 in the nut.

The nut 4 is placed on the blank 7, as indicated by dotted lines in Fig. 4, and the short arms 9 are then bent up around the ends 6 of the nut and over on top of the same, as best shown in Fig. 7, so as to embrace the nut and securely and permanently lock it to the clip. The fact that the arms 9 of the clip are bent into the recessed ends 6 of the nut serves to accurately hold the same and prevent accidental displacement thereof. After the nut has been secured to the clip by means of the arms 9, as described, the arms 10 are bent downwardly and then outwardly into the shape shown in Fig. 5. In this figure the downward bend is indicated at $a$ and the outward bend at $b$. Between these bends there is a portion $c$ of each arm which extends in an inclined position, and the portion $d$ at each end, which lies parallel with the face of the nut. It will be noted that the portions $c$ of the clip converge somewhat so that the bends $b$ are closer together than the bends $a$. The bends $b$ are, however, spaced apart a distance at least equal to the diameter of the opening 5 of the nut.

It will also be observed that the portions $d$ of the clip lie in the same plane.

Cooperating with the nut 4 is a screw 11. This preferably has a smooth tapered point 12 and a conical head 13. Surrounding the head is a washer 14 which may be of any desired construction, but preferably is shaped as shown.

The upholstery material or the like is indicated at U and is provided with a series of holes $u$ through which the screws may be inserted.

In attaching upholstery or the like by means of my improved fastening device, one of the clips 7 carrying the nut 4, as described, is inserted through a slot 3 in the hollow frame member 2, the transverse dimension of this slot being such as to permit the assembled nut and clip to pass through it. A screw 11 with a washer 14 under the head thereof is then inserted through one of the holes in the material U and is pushed through the opening 3 between the bends $b$ of the clip, the pointed end of the screw entering and becoming engaged with the nut 4, as shown in Fig. 5. The material U is thus held between the washer 14 and the base portions $d$ of the clip. Owing to the fact that the opening 3 is in the form of a slot, it will be noted that the clip may be positioned longitudinally thereof to any point required to properly register with the opening $u$ in the upholstery material.

After the screw has been inserted, as described, it is screwed up tight, and during this operation the nut is caused to travel axially toward the head of the screw, with the result that the clip is compressed and caused to collapse so as to engage and firmly grip the edges of the opening. With the specific construction of clip illustrated, it will be seen that the metal adjacent the bends $a$ and $b$ is folded together, in such manner that the edge of the opening is gripped between each fold or bend $a$ and the opposing base portion $d$ of the clip. After the clip has been deformed or compressed into the shape shown in Figs. 6 and 7, it will be understood that it is firmly and permanently anchored to the frame member, and the upholstery material is thus securely attached.

Moreover, the screw 13 may at any time be taken out, if it is desired to remove the upholstery material, and the clip and nut will remain in position so that the screw may be readily replaced.

While I have shown and described a specific form of collapsible clip, it will, of course, be understood that the invention contemplates broadly the use of any deformable clip which can be caused to engage or clinch over the edge of the opening by compression.

It will thus be seen that I have provided an attaching device which can be used in connection with any type of hollow frame members without the necessity for using wooden nailing strips or the like, and that not only can the upholstery material be accurately positioned and securely fastened by means of my invention, but also the screws can be removed and replaced at will, as often as may be necessary. One of the principal difficulties heretofore encountered in the application of removable upholstery panels is the alignment of the parts of the separable fasteners used. Not only do unavoidable errors occur when it is attempted to place one half of the section or member of the fastener on the upholstery and the other member upon the part to be upholstered, but there is inevitably lost motion between the parts. Extremely accurate work and great care might bring the result sought through the old method, but it is extremely expensive. Often times the upholstery is to be applied as a unit to an assemblage of parts in which errors which are in positional location are introduced through variations in assembly. But over and above these difficulties is that outstanding one arising from the fact that when the upholstery is held over the part to which it is to be applied, those portions of the separable fasteners connected with the underneath part are entirely hidden from the sight of the workman. Bringing the parts of the fastener into light then becomes a matter of patience. My invention obviates all of these difficulties.

It will clearly be seen that my invention comprises a method as well as an apparatus and now that the apparatus has been seen, the method will be clearly understood. It consists in applying removable upholstery by pre-establishing in definitive positional relation either on the upholstery or the member to be upholstered the entire group of separable fasteners, applying the upholstery and securing it in place through the intermediary of the separable fastener, utilizing the act of securing the members together to anchor in place on the other member a portion of each separable fastener, whereby when the upholstery is removed, the anchored and unanchored portions of the separable fastener have identically the same positional relation to each other as established by the pre-assembly in definitive relation on the upholstery or the member to which it is to be applied.

What I claim is:

1. A device for attaching upholstery to a panel comprising a bendable sheet metal clip of flat stock having arms, and a nut held solely and positively by said clip against axial, rotative, and lateral movement through interlocking formations on the nut and arms.

2. A device for attaching upholstery to a panel comprising a flatly foldable sheet metal clip, and a nut, said clip having a portion thereof enclosing said nut and having interlocking engagement therewith, whereby the latter is held against rotative, and lateral movement in all directions independently of other securing means.

3. A device for attaching upholstery to a panel comprising a flatly foldable sheet metal clip, and a nut, said clip engaging said nut upon its top and bottom sides and upon two of its edges, whereby the nut is held against axial, rotative, and lateral movement independently of other securing means.

4. A device for attaching upholstery to a panel comprising a bendable sheet metal clip of flat stock, and a nut having two of its diametrically opposite edges recessed, said clip enclosing said nut with portions thereof pressed into said recesses and engaging the nut at top and bottom, whereby the clip forms the sole means for holding said nut against axial, rotative, and lateral movement.

5. A device for attaching upholstery to a panel comprising a bendable sheet metal clip formed from a substantially cross shaped blank of flat stock having one pair of its arms of greater length than the other pair thereof, and a nut arranged on said clip and held thereon by the short pair of arms of the blank which substantially enclose the same, the longer pair of arms of said blank extending outwardly so that their outer extremities will lie against the exterior of the panel, whereby when a screw is threaded through said nut, the latter is held against axial, rotative, or lateral movement and the clip is bent flatly so as to grip the panel between portions of the longer pair of arms of the blank.

6. A device for attaching upholstery to a panel comprising a bendable sheet metal clip of flat stock, and a nut having an irregular edge portion, said clip enclosing said nut and conforming to the irregularity of the nut, and engaging the nut at top and bottom, whereby the clip forms the sole means for holding said nut against axial, rotative and lateral movement.

In testimony whereof I hereunto affix my signature.

JOSEPH LEDWINKA.